Oct. 21, 1969  C. J. LEFTAULT, JR., ET AL  3,473,967
METHOD OF MAKING A DRY CELL BATTERY PROVIDED
WITH A PROTECTIVE CLOSURE
Filed June 23, 1967  3 Sheets-Sheet 1
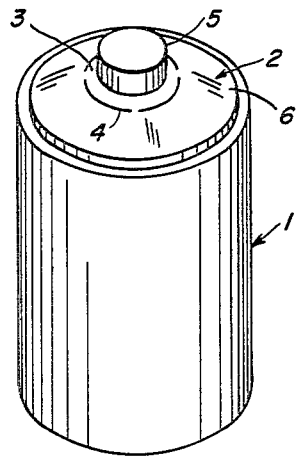
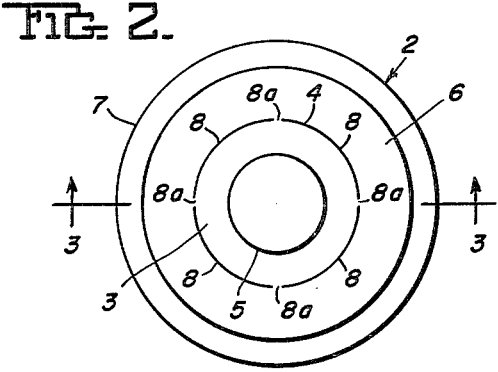
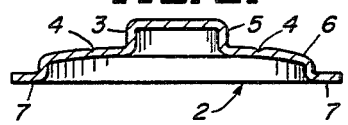
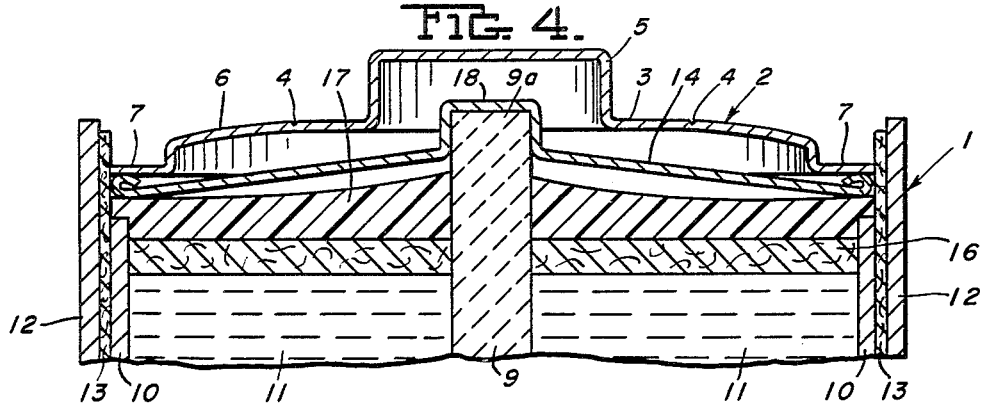
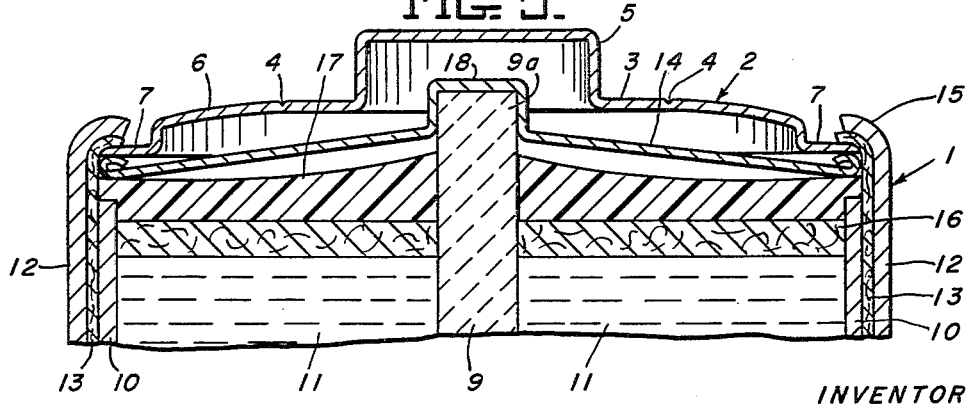
INVENTORS.
CHARLES J. LEFTAULT, JR. &
ROBERT L. LaBARGE
By Arnold B. Silverman
Attorney

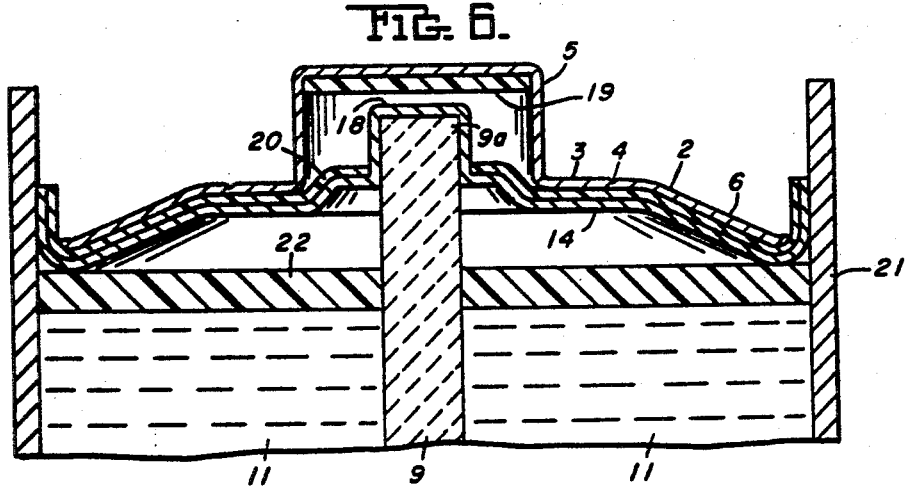
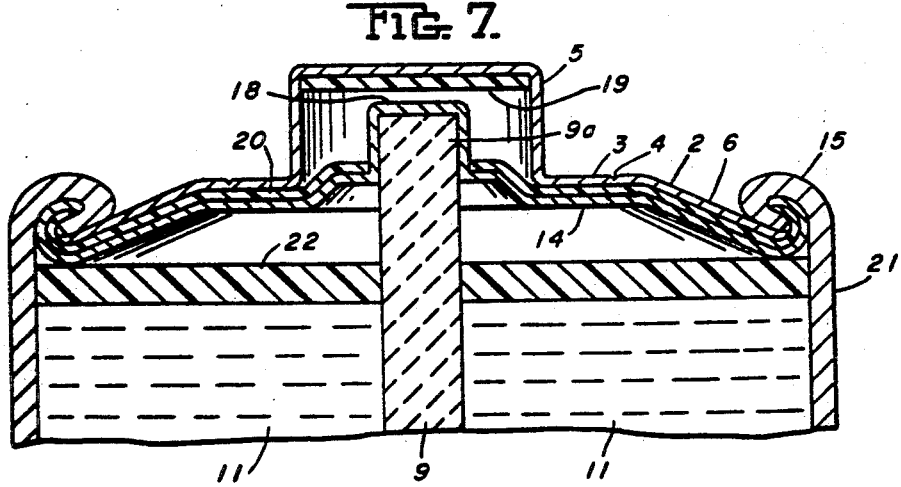
INVENTORS.
CHARLES J. LEFTAULT, JR. &
ROBERT L. LaBARGE
By Arnold B. Silverman
Attorney

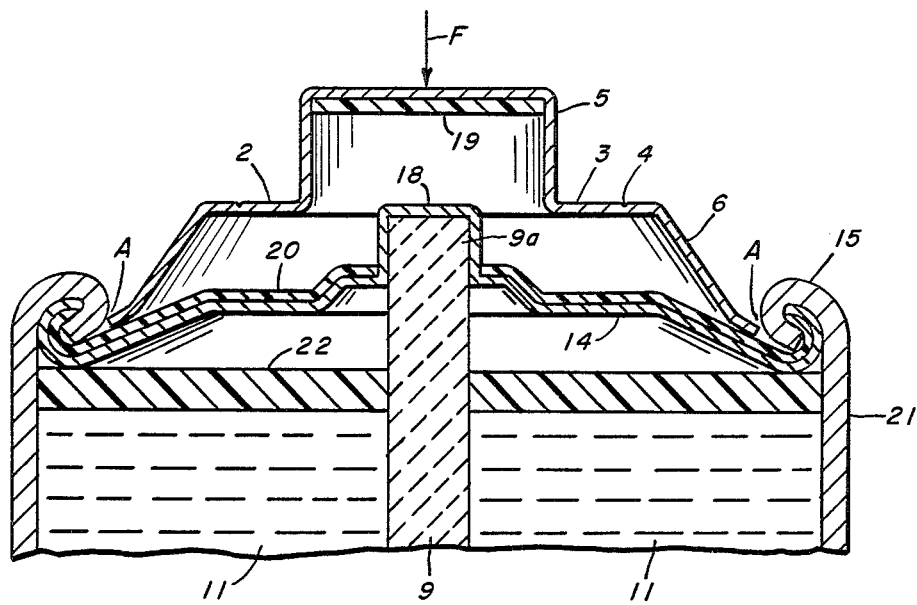

under Patented Oct. 21, 1969

3,473,967
METHOD OF MAKING A DRY CELL BATTERY PROVIDED WITH A PROTECTIVE CLOSURE

Charles J. Leftault, Jr., Richmond, Ind., and Robert L. La Barge, Pittsburgh, Pa., assignors to Aluminum Company of America, Pittsburgh, Pa., a corporation of Pennsylvania
Filed June 23, 1967, Ser. No. 648,438
Int. Cl. H01m 1/02
U.S. Cl. 136—175                           3 Claims

ABSTRACT OF THE DISCLOSURE

A method of pilferproofing a battery by securing a pilferproof closure within a battery seam. A method of securing the closure to a battery after battery manufacture is completed by applying a downward force to the closure to cause the periphery to expand radially and engage the battery seam.

---

This invention relates to closures for batteries and more specifically it relates to a method of creating a pilferproof battery assembly.

The conventional methods of shipping and marketing dry cell batteries are such that no effective protection is provided to battery terminal. No only is intentional use of the battery without leaving any visual indication of such use a problem, but also inadvertent shortening may occur during such periods. The consumer is, therefore, unable to purchase a battery with any degree of certainty as to its not having been in use previously. Also, when batteries are stored in a household, there is frequently uncertainty as to whether a battery has been previously used. This is particularly so where children have access to the storage area.

Examples of closures which will effectively prevent undetectable access to the battery terminal are disclosed in our copending applications U.S. Ser. Nos. 648,439 and 648,450, both filed June 23, 1967.

It is an object of this invention to provide a method of economically securing such closures to dry cell type batteries to provide a pilferproof battery assembly.

It is another object of this invention to provide a simple method of securing such closures to dry cell batteries during battery manufacture.

Yet another object of this invention is to provide a practical and economical method of securing such a pilferproof closure to a dry cell battery after completion of the battery manufacture.

These and other objects of this invention will be more fully understood and appreciated from the following description of the invention, on reference to the illustrations appended hereto, in which:

FIG. 1 is a perspective representation of a battery having a type of closure of this invention;

FIG. 2 is a plan view of a type of closure of this invention;

FIG. 3 is a vertical section of the closure shown in FIG. 2 taken alone line 3—3;

FIG. 4 is an enlarge fragmentary vertical section of a battery during battery assembly having a pilferproof closure loosely seated thereon;

FIG. 5 is the battery of FIG. 4 after completion of assembly;

FIG. 6 is an enlarged fragmentary vertical section of a dry cell battery and a loosely applied modified form of pilferproof closure shown in position prior to affixation;

FIG. 7. shows the assembly of FIG. 5 after the closure has been secured to the battery; and FIG. 8 is an enlarged fragmentary vertical section of a completed battery having a loosely applied pilferproof closure shown in position prior to affixation.

Considering the drawings in greater detail, FIG. 1 shows a dry cell type battery 1 having a pilferproof closure 2 secured over the top wall of the battery. The closure, which in the form illustrated is substantially circular, has a removable section 3 defined by weakened line 4. Within removable section 3 is an upwardly extending boss 5 which overlies the battery terminal. Access to the battery terminal may be had only by severance of weakened line 4 and removal of sector 3.

In FIG. 2 and 3, it will be seen that the weakened line 4 divides the closure 2 into two sectors. The closure has an inwardly disposed removable sector 3 and an outwardly disposed annular peripheral sector 6. At the outermost portion of peripheral sector 6 is an annular flange 7. The portion of the closure 2 intermediate flange 7 and weakened line 4 extends generally upwardly and inwardly. This configuration conveniently complements the upward and inward slope of the top wall of the battery.

The weakened line 4 shown in FIG. 2 consists of alternate lanced or fractured sectors 8 and bridged sections 8a. The bridge sections 8a are either unweakened or weakened to a lesser extent than lanced sectors 8. If desired, they may also be weakened, as by scoring. While there is no critical minimum number of bridges 8a, there should be a sufficient number to prevent the lanced sections 8 from providing an opening sufficiently large to permit access to the battery terminal 9a by means of a wire or other conductive member.

The enlarged sections of FIGS. 4 and 5 illustrate a form of battery assembly contemplated by the method of this invention. The battery has a top wall 14, a lateral or side wall 12 and a bottom wall (not shown). The dry cell battery selected for illustration has a centrally disposed carbon electrode 9 and generally cylindrical zinc electrode 10. A terminal 9a is located at the uppermost portion of electrode 9. An electrolyte 11 is disposed intermediate the electrodes. The lateral or side wall 12 of the battery is made of metal such as steel and is separated from the zinc electrode 10 by an insulating material 13 such as paper, for example. Top wall 14 is joined to the lateral wall 12, with the seam being folded inwardly onto the periphery of top wall 14. An insulating material 17 is disposed above an annular cardboard member 16. The insulating material 17 prevents contact between zinc electrode 10 and top wall 14.

Any reference to the "exposed portion" of the battery top wall shall refer to the portion of the top wall visible prior to closure attachment. In FIG. 4, the closure 2 is shown as being substantially coextensive with the exposed portion of top wall 14 and is secured to the battery by means of annular flange 7 which is retained in seam 15. The boss 5 is shown in overlying relationship with respect to the terminal 9a. As illustrated, the closure boss 5 is in spaced overlying relationship with respect to the terminal 9a as well as the portion 18 of the top wall 14 which overlies the terminal 9a. (For clarity of explanation the word "terminal" has been used to refer to the upper portion of electrode 9 and the overlying top wall portion has been given reference numeral 18. It is to be understood, however, that as portion 18 is made from a conductive material, the word "terminal" in a general sense will be employed to refer to either terminal 9a or portion 18 as they are functionally equivalent.) Alternatively, the boss 5 could be placed in an overlying position which permits contact with the electrode, provided the boss is either composed of a non-conductive material or an insulating interface is provided intermediate the boss 5 and the terminal 9a. It is thus appreciated that it is essential to prevent the creation of an electrical path between the battery terminal 9a and the outside of the closure. This may be effected by employing a boss of nonconductive material or using a spaced overlying relationship thereby employing the air as an insulator or by providing an intermediate insulating material or any other convenient means. The use of an insulating material 19 is illustrated in FIGS. 6 and 7. This may conveniently be a web of insulating material such as paper or plastic or an insulating coating, such as an organic coating, for example. As the overlying top wall portion 18 must be a conductive material in order for the battery to function properly during use, it is generally preferable to either rely upon the insulating methods recited above rather than coat or cover the overlying top wall portion 18. Should it be desired, however, it is entirely acceptable to cover this portion 18 as by a removable insulating material, such as tape, in order to effect insulation from the boss 5.

In the forms of battery and closure shown for purposes of illustration, both the top wall 14 and the closure 2 are made of electrically conductive material. In such an arrangement in order to insulate the terminal 9a from the closure, it is necessary to provide additional insulation. This may be obtained in any convenient fashion as by coating at least a portion of either the top wall 14 and closure 2 with an insulating material, or by providing a separate insulating web. In FIGS. 4 and 5, an insulating coating (not shown) could be provided between flange 7 and the radially outer portion of top wall 14. In the form shown in FIGS. 6 and 7, the battery top wall 14 has an insulating coating 20 applied over a substantial portion of its outer surface. Also, an insulating material (not shown) is provided to separate conductive lateral wall 12 from the zinc electrode (not shown). Should either the closure 2 or top wall 14 excluding the overlying top wall portion 18 be made of non-conductive material, the supplemental insulation would not be required.

The method of this invention contemplates providing a closure 2 with a removable sector 3 defined by at least one weakened line 4. An upwardly disposed hollow boss 5 is formed within the removable sector 3. In the preferred form, the radially outermost portion of the closure is engaged with and permanently secured to the annular seam 15. With a closure having a substantially continuous annular flange 7, the flange may be continuously secured within seam 15 to establish continuous engagement.

FIGS. 4 and 5 of this invention illustrate a method of pilferproofing a battery during battery manufacture. The battery shown in FIG. 4 is substantially completed except for the creation of the radially inwardly directed upper seam 15 by the downward and radially inward folding of the uppermost portions of insulating material 13 and lateral wall 12. For simplicity of explanation, the seam 15 while frequently formed with tip wall 14, insulating material 13 and lateral wall 12, will be referred to generally as being formed between the top and lateral walls. It will be understood that this expression is simplified and includes seams formed with one or more plies of inwardly disposed insulating material 13 and/or outwardly disposed label plies being present in the joint in addition to the top and lateral walls. The closure 2 is loosely placed over the top wall 14 which boss 5 overlying terminal 9a. In completing manufacture of the battery, the upper portions of material 13 and lateral wall 12 are deformed to establish seam 15 which will overlie annular flange 7. The closure is therefore permanently secured to the battery by crimped or frictional retention within seam 15.

FIGS. 6 and 7 illustrate a method of pilferproofing during battery manufacture similar to that shown in FIGS. 4 and 5, except that a modified form of seam is established. Rather than merely folding the lateral wall downwardly and inwardly, a more substantial seam is formed. The battery top wall 14 is larger than that shown in FIGS. 4 and 5 and the peripheral portion is turned upwardly. A seam is established between the upturned top wall portion and the upper portion of the lateral wall 21. For simplicity of illustration, the details of inner battery construction have not been shown in either of these figures or in FIG. 8.

It will be appreciated that by this method the closure is simply and effectively secured to the battery to establish a pilferproof battery assembly. The method yields a battery assembly which has a closure overlying the exposed portion of the top wall 14, and completely covering the terminal thereby preventing contact with the terminal 9a.

If desired, the method of this invention may be employed to produce a pilferproof battery assembly after battery manufacture has been completed. As is shown in FIGS. 7 and 8, the battery has radially inwardly directed seam 15, joining peripheral wall 21 with top wall 14. A substantial portion of the top wall 14 is coated with an insulating material 20. In FIG. 8, the closure 2 is shown loosely placed upon the battery top wall 14 of the completed battery with the boss 5 overlying terminal 9a. By applying a downwardly directed force F of carefully selected magnitude to closure 2, the annular flange 7 is caused to bear downwardly and radially outwardly on the outer portion of the top wall 14. As a result, annular flange 7 is expanded radially outwardly, enters seam area A and frictionally engages the seam 15, thereby permanently securing the closure to the battery resulting in an assembly similar to that shown in FIG. 7. As flange 7 moves downwardly, it is guided outwardly into frictional engagement with seam 15 by sliding contact with the top wall. With the preferred form of closure having a continuous annular flange 7, a uniform, continuous, permanent joint is provided.

In applying the closure after battery manufacture by means of this method, it is preferred but not essential that at least a part of the force applied to the closure be applied radially outwardly of removable sector 3. To the extent to which the force is applied within removable sector 3, it should be less than the force required to sever weakened line 4, but adequate to contribute to effecting frictional engagement of the annular flange 7 with the battery seam 15. If desired, all of force F may be applied to annular peripheral sector 6 or to removable sector 3 (FIG. 8) during closure application by this method.

An obvious advantage in the use of the method of this invention resides in the economical fashion in which battery manufacturers may adapt existing equipment for the use of the method. The method may be employed with a simple addition to existing equipment.

While for purposes of illustration, certain dry cell battery configurations have been shown, it will be appreciated that the closure and method of this invention are intended for use with numerous types of dry cell type batteries.

Whereas particular embodiments of the invention have been described above for purposes of illustration, it will be evident to those skilled in the art that numerous variations of the deetails may be made without departing from the invention as defined in the appended claims.

We claim:
1. A method of manufacturing a pilferproof dry cell battery assembly comprising:
providing a dry cell battery having a bottom wall, a top wall with a substantially centrally disposed terminal, and a connecting wall with said top wall joined to said lateral wall by a radially inwardly directed seam;
providing a substantially rigid circular closure having a removable sector defined by at least one weakened line and an upwardly disposed hollow boss having a transverse wall and a cylindrical depending wall disposed within said removable sector;
positioning said closure in overlying relationship with respect to said battery top wall with the circular outer periphery of said closure in continuous cir- cumferential contact with said battery top wall and said transverse wall positioned in noncontacting spaced overlying relationship with respect to said terminal;

applying a downwardly directed force to said closure to cause downward and radially outwardly directed expansion of said circular outer periphery to establish circumferentially continuous permanent engagement of said outer periphery intermediate said seam and said top wall while maintaining said transverse wall in spaced overlying relationship with said terminal; and said downwardly directed force being of insufficient magnitude to initiate fracture of said weakened line.

2. The method of claim 1 comprising:

said provided closure made from a resilient, substantially rigid electrically conductive material;

applying said downwardly directed force to said closure to uniformly and simultaneously expand said circular outer periphery while maintaining said configuration of said boss; and guiding said outer periphery of said closure into circumferentially continuous frictional engagement with said seam by means of sliding contact with the upper surface of said top wall.

3. The method of claim 2 comprising:

prior to placing said closure on said top wall, providing electrical insulating means to a portion of at least one of the lower surface of said closure and the upper surface of said top wall; and applying a substantial portion of said downwardly directed force to said closure radially outwardly of said removable sector.

References Cited

UNITED STATES PATENTS 3,220,885  11/1965  Udell et al. _____ 136—1

FOREIGN PATENTS 967,418  8/1964  Great Britain.

WINSTON A. DOUGLAS, Primary Examiner

D. L. WALTON, Assistant Examiner

U.S. Cl. X.R.

136—169